United States Patent [19]

Hoffmann et al.

[11] Patent Number: 4,804,425

[45] Date of Patent: Feb. 14, 1989

[54] PROCESS AND LAMINATOR FOR THE CONTINUOUS PRODUCTION OF LAMINATES OF FOAM WITH FACINGS

[75] Inventors: Erwin Hoffmann, Leverkusen; Hans-Dieter Pfeil, Wuppertal; Werner Dietrich, Odenthal; Rolf Bock, Leverkusen, all of Fed. Rep. of Germany

[73] Assignee: Bayer Aktiengesellschaft, Bayerwerk, Fed. Rep. of Germany

[21] Appl. No.: 57,133

[22] Filed: Jun. 1, 1987

[30] Foreign Application Priority Data

Jun. 18, 1986 [DE] Fed. Rep. of Germany ....... 3620317

[51] Int. Cl.[4] .............................................. B32B 31/16
[52] U.S. Cl. ..................................... 156/73.6; 156/79; 156/324; 156/550; 156/583.5; 264/46.5; 264/46.7; 264/70; 428/269; 428/317.9
[58] Field of Search ................ 156/73.6, 79, 324, 550, 156/555, 583.5; 264/46.5, 46.7, 70; 428/304.4, 317.9, 269

[56] References Cited

U.S. PATENT DOCUMENTS

| | | | |
|---|---|---|---|
| 3,951,717 | 4/1976 | Herweg et al. | 156/79 |
| 4,025,687 | 5/1977 | Wooler et al. | 428/310 |
| 4,292,363 | 9/1981 | Briggs | 428/247 |
| 4,753,837 | 6/1988 | Hanusa | 428/317.9 X |

Primary Examiner—Robert A. Dawson
Attorney, Agent, or Firm—Gene Harsh; Joseph C. Gil; Richard E. L. Henderson

[57] ABSTRACT

This invention relates to a process and a laminator for the continuous production of laminates of foam with facings. An upper facing and a lower facing and a web of meshwork are introduced into the foaming space of a laminator and a fluid reaction mixture is spread over the lower facing before it runs into the foaming space. The reaction mixture penetrates the web of meshwork as it foams up on its journey through the foaming space and becomes bonded to the facings.

13 Claims, 1 Drawing Sheet

U.S. Patent  Feb. 14, 1989  4,804,425
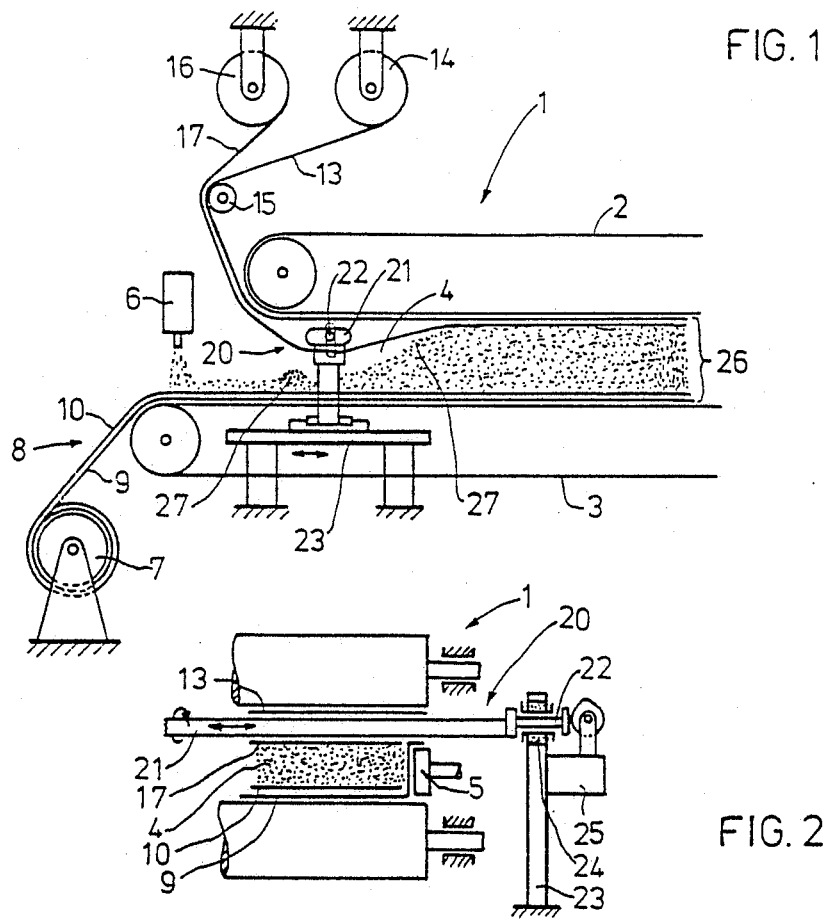
FIG. 1
FIG. 2
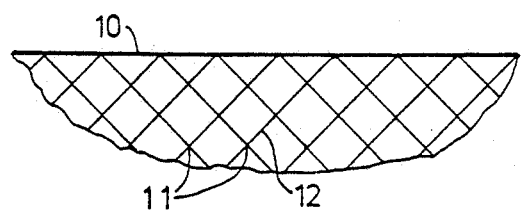
FIG. 3
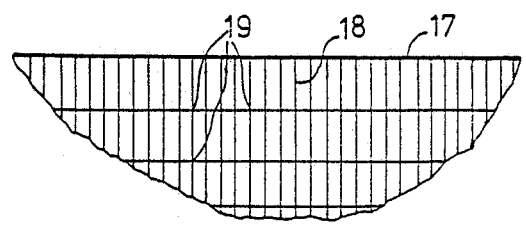
FIG. 4

PROCESS AND LAMINATOR FOR THE CONTINUOUS PRODUCTION OF LAMINATES OF FOAM WITH FACINGS

BACKGROUND OF THE INVENTION

This invention relates to a process and a laminator for the continuous production of laminates of foam with facings. An upper facing and a lower facing and a web of meshwork are introduced into the foaming space of a laminator and a fluid reaction mixture is spread over the lower facing before it runs into the foaming space. The reaction mixture penetrates the web of meshwork as it foams up on its journey through the foaming space and becomes bonded to the facings. The process may be used to produce polyurethane foams, polyisocyanurate foams, phenol resin foams or the like, depending on the starting components used for the fluid reaction mixture from which the foam is formed.

It is well known to cover the back of facings with non-woven fiber webs or to run them into the foaming space together with reinforcing webs such as glass fiber fabric. This procedure is intended to increase the mechanical strength especially immediately underneath the facings and to improve the bond between the facings and the foam core as well as to obtain a profile of decreasing density from the facing layers to the center of the foam. The use of non-woven fiber webs serves mainly for reinforcement. Such webs therefore have a finer mesh and a larger weight per square meter and are made of a high quality material, preferably glass fibers. The generic term, "meshwork web" covers webs of woven fabric, knitted fabric, grids and woven and non-woven fiber fleeces in the widest sense.

It has been found that when facings are used which are impermeable or almost impermeable to gas, gas bubbles of considerable size accumulate underneath the upper facing as the foam expands. These gas bubbles subsequently make their mark on the visible surface of the product if the facings are thin sheets. The irregular bulges formed on the surface not only mar the appearance of the product but since they are formed by cavities they increase the risk of damage to the facings at these points. It has been found that even the use of the conventional meshwork webs such as glass fiber fabrics and non-woven fiber fleeces cannot prevent the formation of gas bubbles. It was found that, depending on the particular nature of these webs, they sometimes showed patches that were completely free from foam, evidently because they had been completely penetrated by gas bubbles. In other cases, the reaction mixture had rrept along inside a web, evidently due to capillary action, and formed a film of foam underneath which the gas bubbles accumulated. Although in the latter case the film of foam together with the reinforcing web had to some extend stabilized the facing, these hollow patches were still more liable to be damaged by sudden, forceful impacts. When the laminating process described above was carried out, the formation of bubbles was found only underneath the upper facing. Gases developing in the course of the reaction of the chemical system and air bubbles enclosed in the application of the reaction mixture evidently have enough time to rise within the expanding reaction mixture and reach the surface or come close to the surface before the reaction mixture hardens.

The problem therefore arises of improving the above-described process and laminator so that laminates of foam with facings will be free from bubbles underneath the upper facing.

BRIEF DESCRIPTION OF THE DRAWINGS

FIG. 1 is a side view of the laminator of the present invention,

FIG. 2 shows the laminator with an end-on view of the foaming space,

FIG. 3 shows a first embodiment of the meshwork web viewed from above, and

FIG. 4 shows a second embodiment of the meshwork web viewed from above.

DESCRIPTION OF THE INVENTION

The above problem is solved by (i) using a meshwork web in which adjacent nodes are spaced apart by 3 to 15 mm and where both the maximum height and the maximum width of the strands of the mesh are in the range of from 0.1 to 2.5 mm, and (ii) introducing this web at a distance of 0 to 15 mm from the upper facing.

The distance between the nodes is preferably about 4 to 10 mm and the height and width or diameter of the strands are preferably from 1.5 to 2 mm. The distance of the meshwork web from the facing is preferably about 4 to 10 mm.

It has surprisingly been found that the purpose of this invention is completely and perfectly fulfilled by using such a meshwork web instead of the reinforcing webs mentioned earlier. It should be remembered that the term "meshwork web" covers woven and knitted fabrics, grids and fiber fleeces in the widest sense, provided only that they fulfill the parameters indicated above. Since non-woven fiber webs have no definable mesh size, most of the openings.in such a web should measure from 9 to 225 $mm^2$, in line wih the distances between adjacent nodes. The size of the mesh is obviously of decisive importance. The desired effect will not be obtained if the mesh is too small or too big. The same applies to the cross-sectional measurements of the connecting strands of the meshwork. These must obviously have a certain width and height or diameter so that even if the meshwork web is placed against the facing the gases will not be encapsulated in the individual meshes but will be able to escape. The materials used for these meshwork webs may be any of the materials hitherto used for reinforcing webs, such as mineral fibers, in particular glass fibers, metal fibers or wires, plastic fibers or wires, carbon fibers and natural fibers such as sisal, jute or hemp, and paper fibers. A meshwork web may, of course, contain several such materials. Moreover, the size of the mesh and the thickness of the strands (threads, wires) may be varied over the width of the web.

It is particularly advantageous to use a meshwork web made of an inexpensive material. It is particularly the use of such inexpensive materials for the meshwork webs that makes the new process so interesting. Waste materials or regenerated materials, in particular plastic waste, may be used for these webs although it goes without saying that high quality materials may also be used, especially if the web is required to act as reinforcement at the same time.

According to one particular embodiment, the meshwork web is introduced into the laminator separately from the facing. This method is the simplest and can be carried out on existing laminators without the attachment of any additional devices since a laminator generally has at least two roll-off stations for the upper facing so that one supply roll can be kept in reserve while the facing is run off the other roll. If necessary, a roller block may be used as reserve supply station for the meshwork web.

Alternatively, a prefabricated composite web may, of course, be run into the laminator to serve both as facing and as meshwork web. In the simplest case, this composite web may consist of a facing which has been rolled up together with a meshwork web so that the two layers are unrolled together as they run into the laminator. Alternatively, the two layers may form a true composite web in which the meshwork web may, for example, be bonded to the facing at regular intervals by means of adhesive or by welding. It is important, however, to ensure that the strands of the meshwork will only lie in contact with the facing at intervals so that the gases can still spread out underneath the facing. Depending on the nature of the meshwork, the facing and the connections between them, especially the thickness of the facing, the connecting points between the two layers may appear on the outside of the facing. If these connecting points are evenly distributed, this may even be used to produce a decorative effect and this effect may be varied according to the choice of the positions of the connecting points.

According to another particular embodiment, at least some of the strands (threads, wires) of the meshwork web are made of a stretchable material. This stretchability, and especially if it is of the elastic kind, has the effect of reinforcing the vibrations to which the web is subjected by its entry into the laminator and by the movements of the conveyor belts so that gas bubbles which are in the process of formation are more easily destroyed.

According to another particular embodiment, a pulsation is imparted to the meshwork web before it makes contact with the expanding reaction mixture. This pulsation is intended to produce the same effect, namely of destroying gas bubbles formed by slight relative displacements of the mesh web or even preventing their formation.

A meshwork web of the kind described above is preferably also introduced at some distance from the lower facing.

It has been found that even if the mesh web is made of an inexpensive material, it has such a stabilizing effect under the facing in the finished foam web that a facing with a low weight per unit area may be used, which is particularly advantageous if the layers are to be rolled up. Although this effect is already known in the art from the use of known kinds of reinforcing webs, it was not foreseeable that it would also apply to the use of the new meshwork webs. This measure is particularly advantageous when high quality facings are used, e.g. aluminum foil, and their thickness may then be reduced, for example to the limit of acceptability. It has hitherto been customary to use foils with a thickness of from about 50 to 80$\mu$ but it is now possible to use foils with only half the usual thickness. This applies equally to the upper facing and not only compensates for the increase in cost due to the additional web of meshwork but even reduces the overall manufacturing cost.

The reaction mixture is preferably allowed to roll back at the beginning of the foam profile as it has been found that certain chemical systems (in particular polyisocyanurate systems) react in such a manner that they have lost a considerable proportion of their adhesiveness by the time they have foamed up sufficiently to come into contact with the upper facing. In the past it had been considered desirable in principle to prevent such rollback, firstly because it entails the risk of air being included in the foam and secondly because it was always considered that the age spectrum of the reaction mixture viewed over the cross-section of the foam should be as narrow as possible. In the present process, therefore, the opposite attitude is adopted in that attempts are made to increase the age spectrum of the mixture by rollback. This has the surprising effect of re-establishing the tackiness. Furthermore any air inclusions due to the rollback appear to dissolve when the new type of meshwork webs are used.

It has already been mentioned that in the simplest case the process can be carried out without any modification of existing laminators. If the meshwork web is to be introduced at some distance from the upper facing or the upper conveyor belt, then it is suitable to use an apparatus comprising an upper conveyor belt and a lower conveyor belt enclosing between them a foaming space and to provide a feed device for reaction mixture above the lower conveyor belt at the inlet end and supply stations for the supply of facings and a meshwork web.

What is novel in the apparatus is that a spacer is arranged at the entrance to the foaming space underneath the upper conveyor belt. This spacer may be provided, for example, in the lateral part of the machine frame. It may consist, for example, of a rail over which the upper facing runs and underneath which the meshwork web slides. The meshwork web must, of course, be introduced in such a manner, either by suitable positioning of the roller block or by provision of an auxiliary roller, that it makes contact with the rail from below. This rail may, for example, be replaced by another rail of a different height for altering the distance between the web and the facing or, in the simplest case, it may be set at a different angle to alter the height. In such an arrangement, the axis of rotation must be situated directly underneath the lower section of the upper conveyor belt so that there will be no gap to clamp the upper facing. Since the rail must be relatively thin in conformity with the desired distance between the web and the facing, it would normally sag if it extends over the usual width of 1 to 1.50 m but it is supported by the web of meshwork and it may in addition be supported by a roller of considerable diameter placed underneath it, in which case the meshwork web would be passed between the roller and the rail. This would, however, presuppose that the height remaining in the foaming space is sufficient for the arrangement of such a supporting roller.

The distance of the meshwork web from the facing as it runs into the expanding reaction mixture may, however, also be adjusted by making the spacer displaceable in the operating direction.

If the spacer is moved closer to the expanding profile, then the angle at which the web enters is inevitably increased so that the distance of the web from the facing is also increased. If the spacer is moved further away from the profile, the angle of entry and distance from the facing is reduced. The meshwork web is, of course, pushed upwards to some extent by the expanding and solidifying reaction mixture so that the point of entry of the web into the expanding foam profile is generally made slightly lower than the final position of the web underneath the facing in the finished product. The position chosen for the entry of the web into the laminator depends to a large extent on the reaction velocity of the chemical system and the speed of the conveyor belt.

According to another embodiment, a pulsator is associated with the spacer. Although other means may be used for pulsating the meshwork web, this solution has the special advantage that the pulsation takes place just before the web makes contact with the rising foam profile. The direction of pulsation may be varied. The pulsation is preferably produced in the plane of the meshwork because it then exerts a sawlike effect on the expanding reaction mixture and destroys any bubbles in the process of formation. There is no risk of solidified foam being cut up by the pulsation since the movements are extremely slight and the pulsation is rapidly damped by the solidifying foam.

An embodiment of the new laminator is shown diagrammatically in the drawings and is described below.

The laminator 1 comprises an upper conveyor belt 2 and a lower conveyor belt 3. A foaming space 4 is enclosed between them and bounded laterally by support bars 5. A feed device 6 for reaction mixture is placed above the lower conveyor belt 3 at the inlet end. A composite web 8 of a facing layer 9 consisting of aluminum foil 40 μm in thickness and a web of meshwork 10 is supplied to the lower conveyor belt 3 from a supply station 7 in the form of a roller block. This meshwork web 10 consists of a metal fabric with nodes 11 (FIG. 3) placed 10 mm apart and connecting strands 12 (wires) having a diameter of 0.5 mm. An aluminum foil of the type described above is also introduced as facing 13 underneath the upper conveyor belt 3. This aluminum foil is drawn off a supply station 14 in the form of a roller seating and is passed over a deflecting roller 15. A meshwork web 17 (FIG. 4) is passed over the same deflecting roller 15 from a supply station 16 also formed by a roller seating. This web 17 is a plastics lattice produced from polyethylene waste. The strands 18 (wires) of this mesh are rectangular in cross-sectio with a height of 1.0 mm and a width of only 0.5 mm. The intersecting strands 18 are welded together at the nodes 19. The distance between the nodes 19 is 3 mm in the axial direction of the web 17 and 10 mm at right angles thereto. The upper facing 13 runs between the upper conveyor belt 2 and a spacer 20. This spacer 20 consists of a rail 21 which is rotatably mounted on the machine frame 23 by axial pins 22. The meshwork web 17 runs underneath the rail 21 and in contact therewith (but a gap is shown between them for the sake of clarity). The distance between the upper facing 13 and the meshwork web 17 dipping into the rising foam profile 24 can be altered by rotating the rail 21. One of the axial pins 22 is coupled to a pulsator 25 which is mounted on the machine frame 23 and which displaces the rail 21 transversely to the operating direction at a frequency of 30 Hz. The laminator 1 operates at a feed rate of 6 m/min. The thickness of the completed laminate 26 is 40 mm. At the beginning of the foam profile, the reaction mixture forms a bulge in the form of a rollback 27 in which older reaction mixture is mixed with more recent reaction mixture.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of foam laminated with facings comprising introducing an upper facing, a lower facing and a meshwork web into the foaming space of a laminator and spreading a fluid reaction mixture out on the lower facing before its introduction into the foaming space, said reaction mixture penetrating the web of meshwork while it foams up during its travel through the foaming space and becoming bonded to the facings, said meshwork web characterized in that it has adjacent nodes spaced apart by 3 to 15 mm and both the maximum height and the maximum width of the connecting strands of the . meshwork measure from 0.1 to 2.5 mm, and wherein said meshwork web is introduced into the apparatus at a distance of 0 to 15 mm from the upper facing.

2. The process of claim 1, characterized in that the meshwork web is introduced separately from the upper facing.

3. The process of claim 1, characterized in that said lower facing comprises a prefabricated composite web of facing and meshwork web.

4. The process of claim 1, characterized in that the meshwork web used is one in which the connecting strands are made at least in part of stretchable material.

5. The process of claim 1, characterized in that the meshwork web is pulsated before it makes contact with the foaming reaction mixture.

6. The process of claim 1, characterized in that a similar meshwork web is also introduced at a distance of 0 to 15 mm from the lower facing.

7. The process of claim 1, characterized in that a rollback of reaction mixture is maintained at the beginning of the foaming profile.

8. A process according to claim 1 wherein said meshwork web has adjacent nodes spaced apart by 4 to 10 mm.

9. A process according to claim 8 wherein both the maximum height and the maximum width of the connecting strands of the meshwork measure from 1.5 to 2 mm.

10. A process according to claim 1 wherei said meshwork web is introduced into the apparatus at a distance of 4 to 10 mm from the upper facing.

11. A laminator comprising an upper conveyor belt ad a lower conveyor belt which bound a foaming space, a feed device for reaction mixture being provided above the lower provided for supplying facings, and a meshwork web, said laminator further characterized in that a spacer that is displaceable in the operating direction is arranged underneath the upper conveyor belt at the entrance to the foaming space.

12. A laminator comprising an upper conveyor belt and a lower conveyor belt which bound a foaming space, feed device for reaction mixture being provided above the lower conveyor belt at the inlet end thereof and supply stations being provided for supplying facings, and meshwork web, said laminator further characterized in that a spacer that is adjustable in height is arranged underneath the upper conveyor belt at the entrance to the foaming space.

13. A laminator comprising an upper conveyor belt and a lower conveyor belt which bound a foaming space, a feed device for reaction mixture being provided above the lower conveyor belt at the inlet end thereof and supply stations being provided for supplying facings, and a meshwork web, said laminator further characterized in that a spacer associated with a pulsator is arranged underneath the upper conveyor belt at the entrance to the foaming space.

* * * * *